United States Patent
Shimizu et al.

(10) Patent No.: US 8,758,545 B2
(45) Date of Patent: Jun. 24, 2014

(54) METHOD FOR PRODUCING MOLDED BODY

(75) Inventors: Takayuki Shimizu, Tokyo (JP); Yuya Nagatomo, Tokyo (JP); Daisuke Miwa, Tokyo (JP); Sohei Arakawa, Tokyo (JP); Toru Nishioka, Gotenba (JP); Yusuke Shibuya, Gotenba (JP)

(73) Assignees: Mitsubishi Heavy Industries, Ltd., Tokyo (JP); The Society of Japanese Aerospace Companies, Tokyo (JP)

( * ) Notice: Subject to any disclaimer, the term of this patent is extended or adjusted under 35 U.S.C. 154(b) by 0 days.

(21) Appl. No.: 13/700,548

(22) PCT Filed: Jun. 27, 2011

(86) PCT No.: PCT/JP2011/064719
§ 371 (c)(1),
(2), (4) Date: Nov. 28, 2012

(87) PCT Pub. No.: WO2012/002340
PCT Pub. Date: Jan. 5, 2012

(65) Prior Publication Data
US 2013/0189430 A1 Jul. 25, 2013

(30) Foreign Application Priority Data
Jul. 1, 2010 (JP) ................... 2010-151218

(51) Int. Cl.
*B03D 3/00* (2006.01)
(52) U.S. Cl.
USPC ....................................... 156/307.1; 427/243
(58) Field of Classification Search
USPC ........................................ 156/307.1; 427/243
See application file for complete search history.

(56) References Cited

FOREIGN PATENT DOCUMENTS

| JP | 5-147048 | 6/1993 |
|---|---|---|
| JP | 2000-19090 | 1/2000 |
| JP | 2006-175606 | 7/2006 |
| JP | 2006175606 A * | 7/2006 |
| JP | 2006-289646 | 10/2006 |
| JP | 2006289646 A * | 10/2006 |
| JP | 2007-521987 | 8/2007 |
| WO | 2005/070642 | 8/2005 |

OTHER PUBLICATIONS

International Search Report issued Sep. 13, 2011 in corresponding International Application No. PCT/JP2011/064719.
Written Opinion of the International Searching Authority issued Sep. 13, 2011 in corresponding International Application No. PCT/JP2011/064719.

* cited by examiner

*Primary Examiner* — Michael Orlando
*Assistant Examiner* — Daniel Lee
(74) *Attorney, Agent, or Firm* — Wenderoth, Lind & Ponack, LLP

(57) ABSTRACT

A method for producing a molded body in which the matrix of a composite material is prevented from penetrating into carbon foam. The method includes: disposing a thermosetting adhesive (3) on a porous body (2), disposing a composite material (4) containing a thermosetting resin as a matrix on the adhesive, curing the adhesive, and liquefying and curing the matrix of the composite material after the adhesive has been cured. In this production method, because the cured adhesive bonds strongly to the porous body before the matrix of the composite material is liquefied, the subsequently liquefied matrix of the composite material can be prevented from penetrating into the interior of the porous body.

3 Claims, 5 Drawing Sheets

METHOD FOR PRODUCING MOLDED BODY

BACKGROUND OF THE INVENTION

1. Technical Field

The present invention relates to a method for producing a molded body comprising a composite material on top of a porous body.

2. Description of the Related Art

In recent years, in order to enable structures such as aircraft and wind turbine to be produced using composite materials, molding jigs having carbon foam as a core material have been developed (Japanese Publication No. 2007-521987). In a composite material molding jig that uses carbon foam, in order to ensure leak prevention during molding, a composite material or a metal sheet must be bonded to the surface of the jig that contacts the molded item (the tool surface). Generally, a composite material laminate is often selected due to considerations of weight minimization and productivity.

The composite material is a molding material comprising a binding material (matrix) and either fine particles or a fibrous material. For example, the composite material may be composed of a plastic typified by an epoxy resin, and hard fibers formed from carbon or glass, and is used as a prepreg or the like. Spaces known as voids exist inside the composite material.

By subjecting the composite material to heating at high temperature, the curing reaction of the matrix proceeds, and the composite material can be bonded to the surface of a carbon foam. Further, by performing curing under high pressure, the air inside the composite material can be removed.

SUMMARY OF THE INVENTION

1. Technical Problem

When a composite material is heated at high temperature, the matrix contained within the composite material exhibits behavior wherein the matrix initially undergoes a decrease in viscosity and becomes fluid, and then when the curing temperature is reached, undergoes an increase in viscosity and loses its fluidity. Accordingly, when an attempt is made to cure a composite material disposed on carbon foam, the matrix that has undergone a decrease in viscosity and liquefied penetrates into the interior of the carbon foam.

FIG. 10 illustrates a cross-sectional view of the main portions of a molded body 10 produced using a conventional method for producing a molded body. When a matrix 4a penetrates into the interior of carbon foam 2, the amount of the matrix contained within a composite material 4 decreases. When the amount of the matrix decreases, the thickness of the laminate decreases, and fibers may be exposed. In this type of composite material 4 in which fibers are exposed at the surface, voids 5 are generated within the interior of the composite material. In such cases, a problem arises in that even if the surface of the composite material is subjected to machining, the smoothness of the tool surface may not satisfy the required level, meaning the composite material cannot be used as a molding jig.

Accordingly, in order to prevent penetration of the matrix into the interior of the carbon foam, and strengthen the bonding between the carbon foam and the composite material, a technique has been adopted in which an adhesive layer is inserted between the carbon foam and the composite material. In the carbon foam composite tool described in Japanese Publication No. 2007-521987, an adhesive layer is inserted between the carbon foam and the composite material.

However, even when an adhesive layer is inserted, depending on the type of composite material used, and the combination between the composite material and the adhesive, penetration of the matrix into the interior of the carbon foam can still sometimes not be prevented. For example, in those cases where an adhesive is used that liquefies upon heating and subsequently undergoes curing, if the matrix of the composite material liquefies before the adhesive undergoes curing, then both the adhesive and the matrix of the composite material penetrate into the interior of the carbon foam. Because the curing reaction of the composite material is performed under high pressure in an autoclave, the composite material matrix penetrates readily into the interior of the carbon foam, which is under reduced pressure.

The present invention has been developed in light of the above circumstances, and has an object of providing a method for producing a molded body in which the matrix of the composite material is prevented from penetrating into the carbon foam.

2. Solution to the Problem

In order to achieve the above object, the present invention provides a method for producing a molded body that comprises: disposing a thermosetting adhesive on a porous body, disposing a composite material containing a thermosetting resin as a matrix on the adhesive, curing the adhesive, and liquefying and curing the matrix of the composite material after the adhesive has been cured.

In the present invention, an adhesive is inserted between the porous body and the composite material, and the adhesive is cured before the matrix of the composite material is liquefied. Because the cured adhesive bonds strongly to the porous body, the subsequently liquefied matrix of the composite material can be prevented from penetrating into the interior of the porous body. As a result, the thickness of the cured composite material can be maintained, and the generation of voids inside the composite material can be inhibited. In this type of molded body, the surface of the cured composite material is smooth.

In one aspect of the invention described above, the curing of the adhesive preferably includes acquiring the viscosity profile of the adhesive, acquiring the calorific data for when the adhesive cures, and creating a curing reaction formula for the adhesive from the calorific data, correlating the viscosity profile of the adhesive and the curing reaction formula, and setting a prescribed degree of curing for the adhesive, setting curing reaction conditions for the adhesive, based on the curing reaction formula, so that at least the prescribed degree of curing can be achieved, and curing the adhesive to at least the prescribed degree of curing.

As a result of intensive research, the inventors of the present invention discovered that the adhesive need not necessarily have undergone complete curing in order to prevent the liquefied composite material matrix from penetrating into the interior of the porous body. In those cases where an adhesive that cures open heating is used, by curing the adhesive until at least a prescribed degree of curing has been achieved, the desired effect can be obtained without needing to heat the adhesive excessively. In those cases where an adhesive that cures under the action of a catalyst or the like is used, by curing the adhesive until at least a prescribed degree of curing has been achieved, the curing reaction time for the adhesive can be shortened. Further, by using the degree of curing, the timing of the curing of the adhesive can be determined independently of the rate of temperature increase.

In one aspect of the invention described above, an uncured adhesive and the composite material are disposed sequentially on the cured adhesive, and the composite material is subsequently liquefied and cured.

By curing the adhesive in advance on top of the porous body, any holes that exist within the surface layer of the porous body can be filled to some extent. Because additional adhesive is then cured on top of this surface layer, a layer of adhesive can be formed more reliably between the porous body and the composite material. By adopting this method, the surface of the cured composite material can be made even smoother.

In one aspect of the present invention, the curing of the adhesive preferably further comprises acquiring the viscosity profile of the composite material, wherein based on the viscosity profile of the composite material and the aforementioned curing reaction formula, the curing reaction conditions for the adhesive are set so that at least the prescribed degree of curing can be achieved, and the adhesive and the composite material are disposed sequentially on the porous body, and the adhesive is subsequently cured.

By adopting this method, the curing reactions of the adhesive and the composite material can be conducted in a single series of steps, and therefore the operational effort required can be reduced and the operating time can be shortened.

3. Advantageous Effects of the Invention

In the present invention, by setting the conditions for the curing of the adhesive so that the matrix of the composite material liquefies after the adhesive has cured, penetration of the composite material into the interior of the porous body can be prevented.

DETAILED DESCRIPTION OF THE INVENTION

Figure 1:
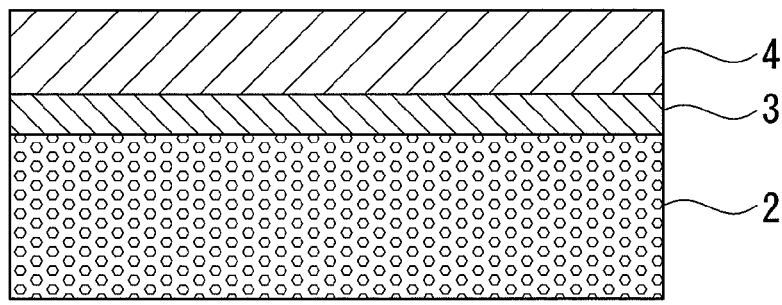
FIG. 1 illustrates a cross-sectional view of the main portions of a molded body produced using the method for producing a molded body according to the present invention.

FIG. 1 is a cross-sectional view of the main portions of a molded body produced using the method for producing a molded body according to the present invention. The molded body 1 comprises an adhesive 3 and a composite material 4 stacked sequentially on a porous body 2.

One embodiment of the method for producing a molded body according to the present invention is described below. In the embodiment described below, the molded body 1 is a molding jig used for producing a structure from a composite material, but the present invention is not limited to this particular configuration.

1. First Embodiment

The porous body 2 preferably has a high degree of rigidity, and is typically carbon foam or the like. In this embodiment, CFOAM20 (manufactured by Touchstone Research Laboratory, Ltd.) is used.

The adhesive 3 uses a material which has thermosetting properties, and which, following curing, exhibits good heat resistance to the curing temperature used for the composite material. The adhesive 3 can be cured by heating or catalyst or the like. Further, the adhesive 3 may be in the form of a gel, a sheet, or a film or the like. In the present embodiment, a film adhesive is used which contains mainly a thermosetting resin and cures upon heating. Specific examples of adhesives that can be used include the epoxy-based adhesives L-313 (manufactured by J.D. Lincoln, Inc.) and 2550B (manufactured by Cytec Industries, Inc.). A material that cures at a lower temperature than the composite material 4 is selected as the adhesive 3.

The composite material 4 is a material that comprises a fibrous material within a matrix. The composite material 4 preferably uses a thermosetting resin as the matrix, and preferably also contains carbon fiber. Examples of the thermosetting resin include epoxy-based resins. For example, prepregs such as Hextool (manufactured by Hexcel Corporation), Duratool (manufactured by Cytec Industries, Inc.), and TRK510/270FMP (manufactured by Mitsubishi Rayon Co., Ltd.) can be used.

The method for producing a molded body according to the present embodiment is described below.

First, the film adhesive is disposed in a prescribed position on the carbon foam. A plurality of layers of the film adhesive is preferably stacked on one another.

Next, the carbon foam having the film adhesive disposed thereon is covered with a back film, and is then secured from the outside using a sealant. The air inside the back film is then extracted and the internal space is placed under reduced pressure. The resulting structure is then transported into an oven and heated to cure the film adhesive. The curing reaction conditions may employ the conditions recommended by the manufacturer.

A peel ply, release film or breather cloth or the like may be stacked on top of the film adhesive prior to covering with the back film.

Next, the composite material is disposed on the cured film adhesive. A plurality of layers of the composite material may be provided, and the number of layers and the direction of fiber alignment may be set appropriately in accordance with factors such as the intended usage of the molded body.

Subsequently, the carbon foam with the composite material disposed thereon is covered with a back film, and the air inside the back film is then extracted and the internal space is placed under reduced pressure. The resulting structure is transported into an autoclave, pressurized to 0.6 MPa, and then heated to cure the composite material. The curing reaction conditions may employ the conditions recommended by the manufacturer.

An uncured adhesive may be positioned beneath the composite material and cured together with the composite material.

According to this embodiment, because the adhesive is cured on the porous body, generating a strong bond between the porous body and the adhesive, before the composite material is disposed thereon, the composite material can be prevented from penetrating into the interior of the porous body.

2. Second Embodiment

In this embodiment, the molded body has the same structure as that of the first embodiment.

With the exception of employing a different process for curing the adhesive, the method for producing the molded body according to this embodiment is the same as that of the first embodiment.

In this embodiment, the process for curing the adhesive comprises steps (1) to (5) described below:

(1) a step of acquiring the viscosity profile of the adhesive, (2) a step of acquiring the calorific data for when the adhesive cures, and creating a curing reaction formula for the adhesive from the calorific data, (3) a step of correlating the viscosity profile of the adhesive and the curing reaction formula, and setting a prescribed degree of curing for the adhesive, (4) a step of setting the curing reaction conditions for the adhesive, based on the curing reaction formula, so that at least the prescribed degree of curing can be achieved, and (5) a step of curing the adhesive to at least the prescribed degree of curing.

First, the viscosity profile of the adhesive is acquired. The viscosity profile can be measured using a commercially available viscosity measuring device or the like.

Figure 2:
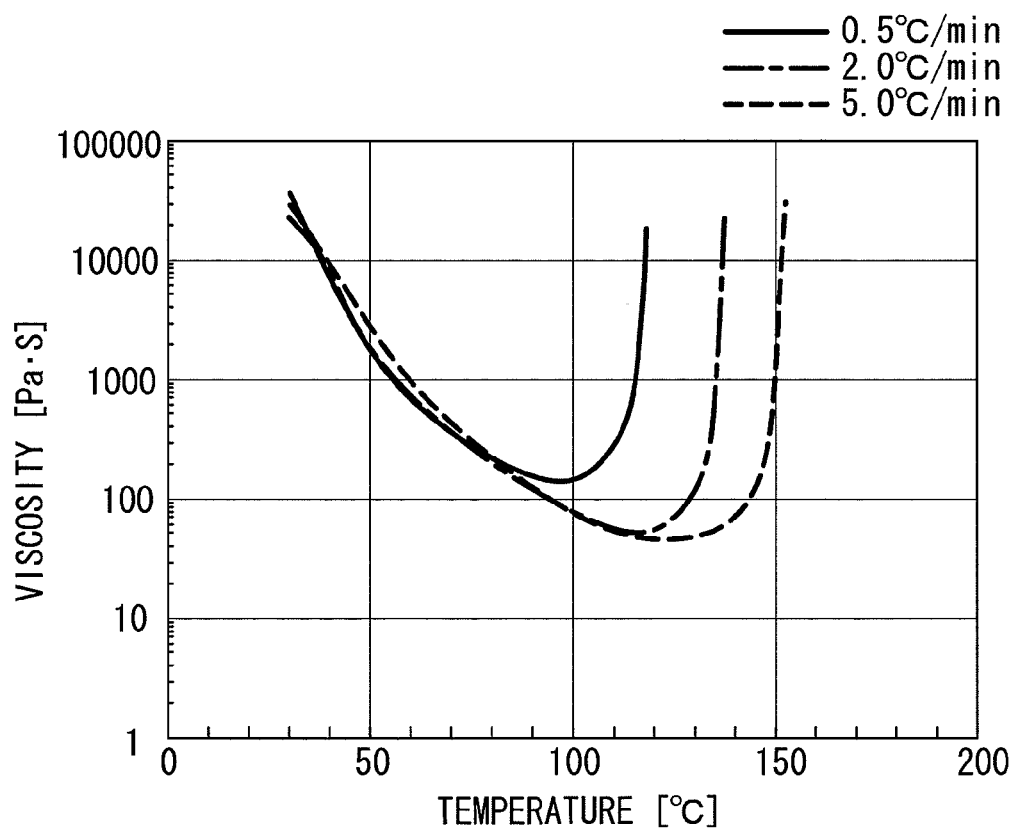
FIG. 2 illustrates a diagram showing examples of viscosity profiles of an adhesive.

FIG. 2 illustrates examples of viscosity profiles of an adhesive. A film adhesive L-313 was used as the adhesive. The rate of temperature increase was set to 0.5° C./min., 2° C./min., or 5° C./min., and measurement was performed three times (at each temperature). In FIG. 2, the horizontal axis represents the temperature and the vertical axis represents the viscosity, and the viscosity profile is illustrated for each of the representative rates of temperature increase. As illustrated in FIG. 2, in the initial stages of heating, the film adhesive gradually softens as the temperature is increased, but when the curing start temperature is reached, a reversal occurs and the viscosity starts to increase. Further, the curing start temperature changes depending on the rate of temperature increase, and the slower the rate of temperature increase, the lower the temperature at which the curing starts. Furthermore, the viscosity of the L-313 prior to heating (the initial viscosity) is approximately 10,000 Pa·s, and the L-313 reached the same viscosity as the initial viscosity at 117° C. for a rate of temperature increase of 0.5° C./min., at 136° C. for a rate of temperature increase of 2° C./min., and at 151° C. for a rate of temperature increase of 5° C./min.

Next, the calorific data when the adhesive cures is acquired. This calorific data can be obtained using a differential scanning calorimeter (DSC). Temperature-calorific value curves are prepared for the different rates of temperature increase, and a curing reaction formula for the adhesive is created from the calorific data.

The curing reaction formula is represented by a formula (A) shown below.

$$d\alpha/dt = f(\alpha, T) \quad (A)$$

In the formula, $\alpha$ represents the degree of curing, t represents the time, and T represents the temperature.

Figure 3:
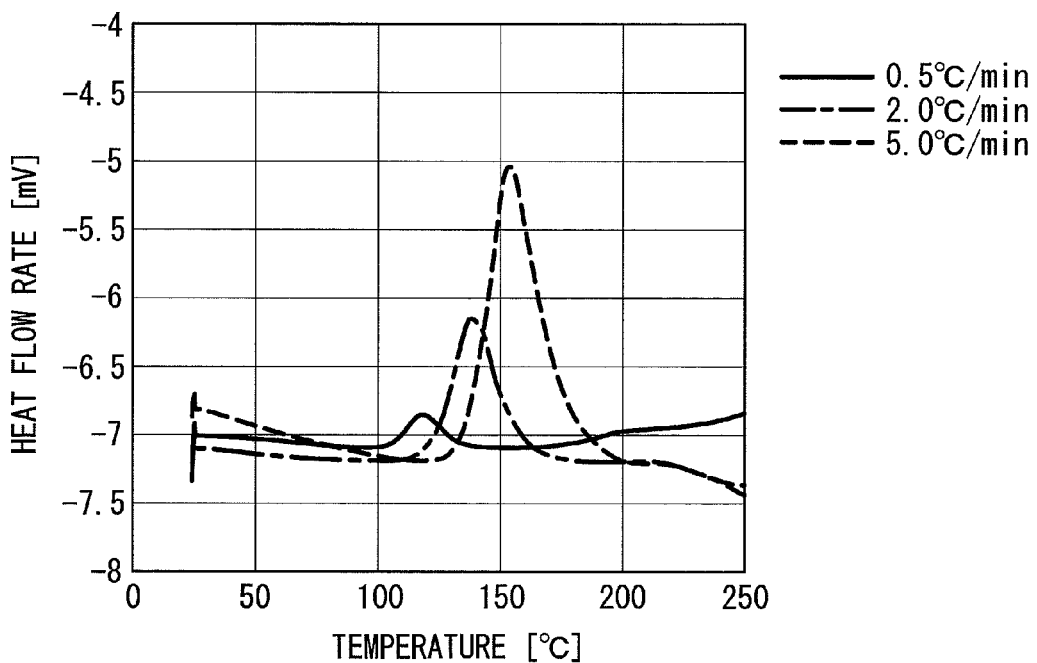
FIG. 3 illustrates a diagram showing examples of calorific data for an adhesive.

FIG. 3 illustrates examples of calorific data for an adhesive. The same film adhesive L-313 as that used in FIG. 2 was used. In FIG. 3, the horizontal axis represents the temperature, and the vertical axis represents the heat flow rate. As illustrated in FIG. 3, the heat flow rate differs depending on the rate of temperature increase.

Based on the formula (A), the following formulas (B) and (C) were applied to the curing reaction formula for L-313.

$$d\alpha/dt = k_1(1-\alpha)^l + k_2\alpha^m(1-\alpha)^n \quad (B)$$

$$ki = Ai \cdot \exp(-Ei/RT) \quad (C)$$

In these formulas, A represents a frequency factor, E represents the activation energy, and k represents a reaction rate constant.

Next, the viscosity profile of the adhesive and the curing reaction formula are correlated, and a prescribed degree of curing is set for the adhesive. This "prescribed degree of curing" describes the degree of curing when either the adhesive cures to form a film, or reaches a viscosity where the adhesive will not penetrate into the porous body. For example, in the case of a prepreg, because the prepreg is able to maintain a film-like shape prior to heating, it can be determined that by performing curing until the viscosity reaches the same viscosity as that (of the resin) prior to heating, a film is able to be formed. In those cases where a gel-like adhesive is used, the (resin) viscosities prior to heating of commercially available prepregs may be used as reference for determining whether or not a film has formed.

Figure 4:
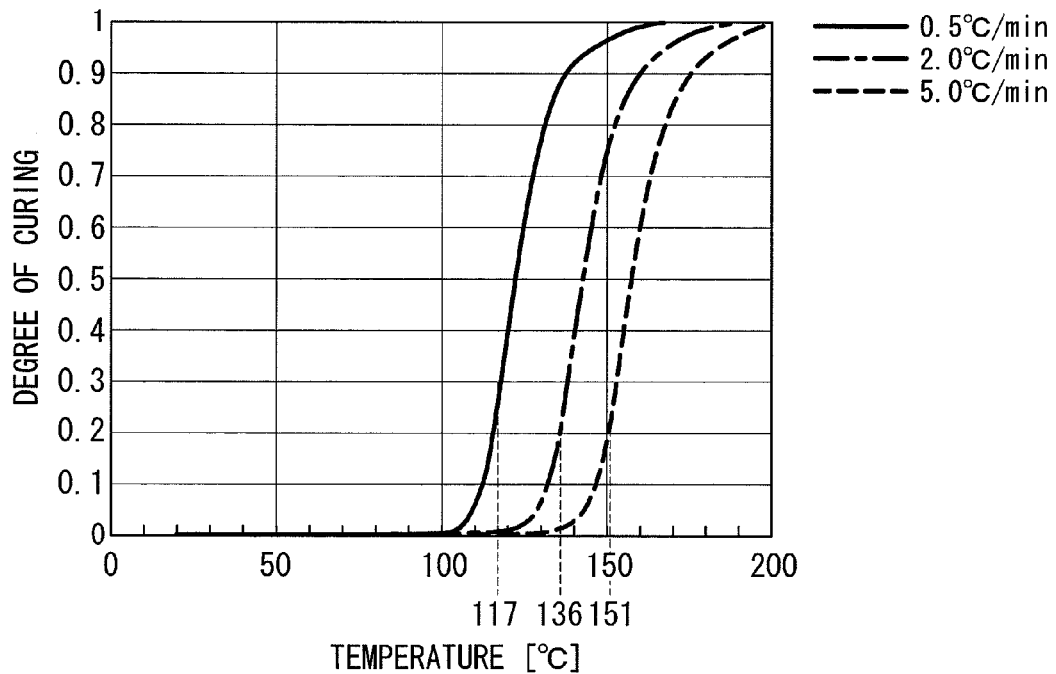
FIG. 4 illustrates a diagram showing the relationship between the heating temperature and the degree of curing for a film adhesive L-313.
Figure 5:
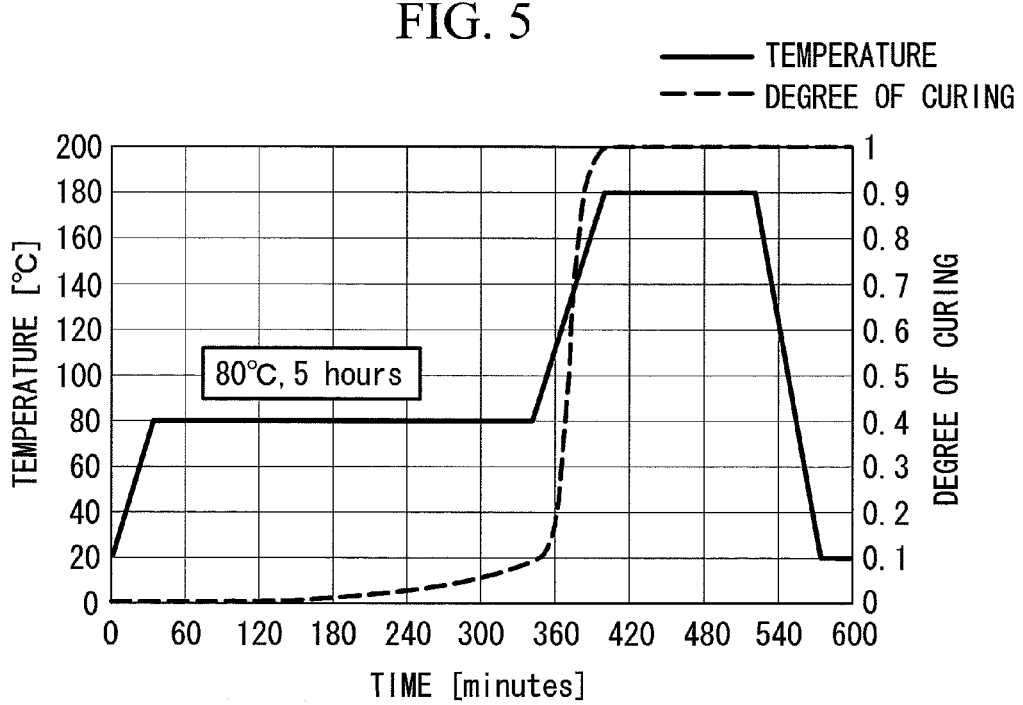
FIG. 5 illustrates a diagram showing a curing cycle using a curing reaction formula.
Figure 6:
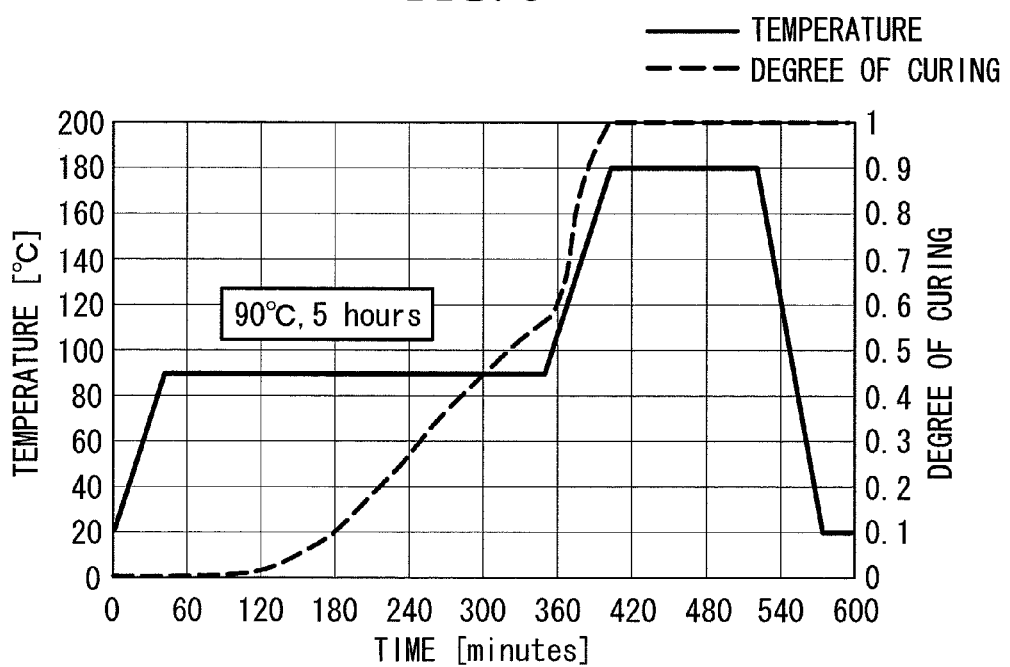
FIG. 6 illustrates a diagram showing a curing cycle using a curing reaction formula.
Figure 7:
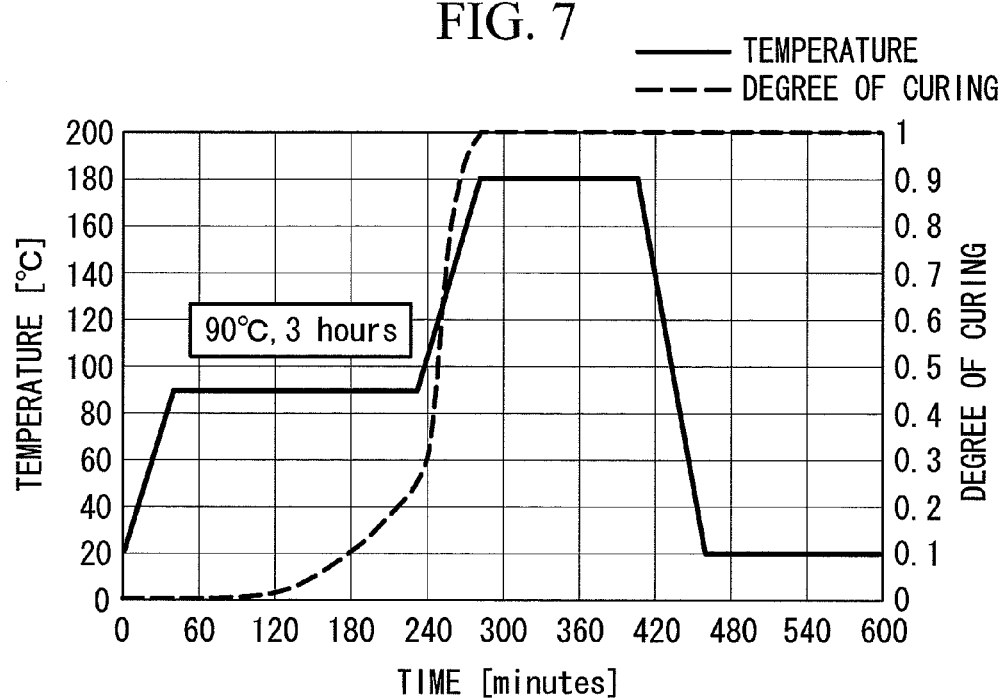
FIG. 7 illustrates a diagram showing a curing cycle using a curing reaction formula.
Figure 8:
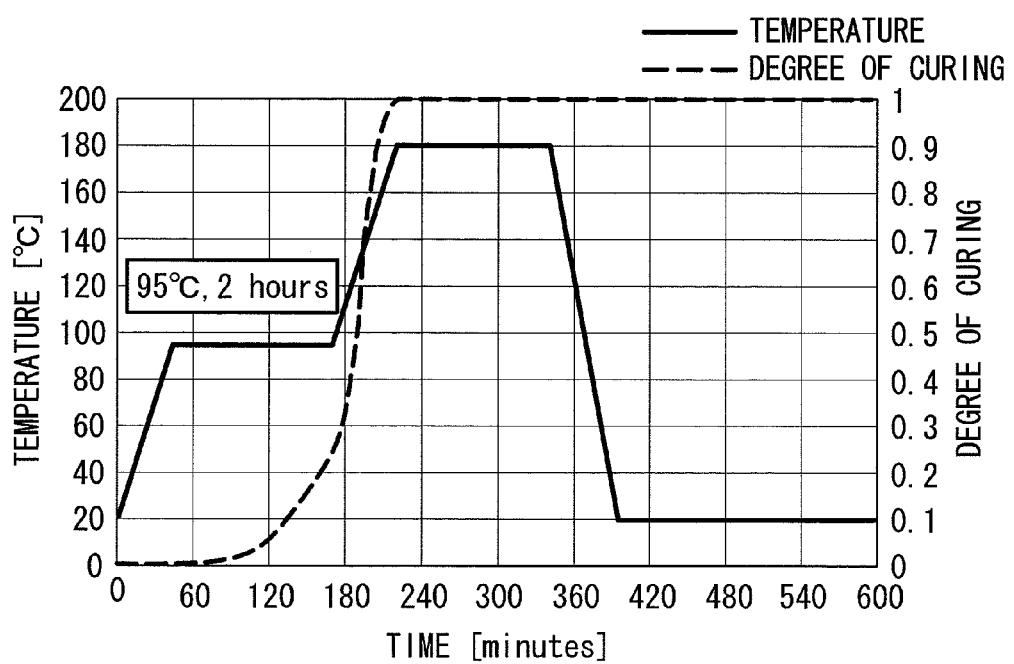
FIG. 8 illustrates a diagram showing a curing cycle using a curing reaction formula.

FIG. 4 illustrates the relationship between the heating temperature and the degree of curing for the film adhesive L-313. Substitutions were made in the above formulas (B) and (C), so that $A_1=9.814E+9$, $E_1=1.214E+5$, $A_2=6.138E+8$, $E_2=8.607E+4$, $l=0.0865$, $m=0.7532$, $n=1.9267$, and R (gas constant)=8.31451, and a graph was prepared (see FIG. 4). $k_1$ and $k_2$ are constants that take account of autocatalysis in a primary epoxy-amino reaction and a secondary epoxy-amino reaction respectively in the initial stages of the reaction. l, m and n are multipliers for each of the reaction states, and were selected by using a genetic algorithm (GA) to alter the reaction formula constants, and then selecting the values that best matched.

As illustrated in FIG. 4, the degree of curing when the film adhesive L-313 had cured sufficiently to reach the same viscosity as the initial viscosity was independent of the rate of temperature increase, and was from approximately 0.2 to 0.25. Based on these results, it is thought that, in the case of L-313, film formation has been achieved at a degree of curing of 0.2 to 0.25. Accordingly, the prescribed degree of curing in the present embodiment was set to 0.25.

Next, the curing reaction conditions for the adhesive are set based on the curing reaction formula. For example, based on the formulas (B) and (C), the combinations of heating temperature and time that yield a degree of curing of 0.25 are calculated, and one of these combinations is selected as appropriate.

Next, the carbon foam having the film adhesive disposed thereon is covered with a back film, and the adhesive is cured under the set curing reaction conditions.

According to this embodiment, by setting the degree of curing, the curing reaction time for the adhesive can be shortened.

3. Third Embodiment

In this embodiment, the molded body has the same structure as that of the first embodiment.

In the method for producing a molded body according to this embodiment, the film adhesive is first disposed in a prescribed position on the carbon foam. Layers of the film adhesive are preferably stacked on one another.

Next, the composite material is disposed on top of the uncured film adhesive. A plurality of layers of the composite material may be provided, and the number of layers and the direction of fiber alignment may be set appropriately in accordance with factors such as the intended usage of the molded body.

Subsequently, the carbon foam having the composite material disposed thereon is covered with a back film, and is then secured from the outside using a sealant. The air inside the back film is then extracted and the internal space is placed under reduced pressure. The resulting structure is transported into an autoclave, pressurized to 0.6 MPa, and then heated to cure the film adhesive and the composite material.

A peel ply, release film or breather cloth or the like may be stacked on top of the composite material prior to covering with the back film.

In this embodiment, the adhesive is cured using a process that includes, in addition to the process for curing the adhesive according to the second embodiment, a step of acquiring the viscosity profile of the composite material. Because the composite material contains a fibrous material, the viscosity profile is preferably acquired using only the resin (matrix). Based on the viscosity profile for the composite material and the curing reaction formula, the curing reaction conditions for the adhesive are set so as to achieve at least the prescribed degree of curing. The remaining steps are the same as those described for the second embodiment.

The case in which L-313 is used as the film adhesive and TRK510/270FMP is used as the composite material is described below as a specific example.

The composite material was heated at a predetermined rate of temperature increase, and the viscosity profile was measured (not shown in the drawings). In the initial stages, the composite material softened as the temperature increased, but when the curing start temperature was reached, a reversal occurred and the viscosity started to increase. The curing start temperature for the TRK510/270FMP was in the vicinity of 140° C. The TRK510/270FMP liquefied at a temperature exceeding approximately 100° C. The term "liquefied" means that the matrix had a viscosity of not more than 2 Pa·s, and was in a state that enabled the matrix to be readily forced into the porous body by the pressurization of the autoclave.

The heating temperature for the adhesive is set to a lower temperature than the curing start temperature of the composite material. When TRK510/270FMP is used as the composite material, the heating temperature for the adhesive is set to 140° C. or lower. During the curing reaction for the adhesive, softening of the composite material is preferably suppressed as far as possible, so that a high viscosity can be maintained. In other words, the heating temperature for the adhesive is preferably lower that the temperature at which the composite material liquefies, and is more preferably the lowest possible temperature that enables the prescribed degree of curing to be achieved within the desired reaction time.

The heating temperature and the reaction time for the curing reaction for the adhesive can be determined from the formulas (B) and (C) using a prescribed degree of curing of 0.25.

FIG. 5 to FIG. 8 illustrate curing cycles using curing reaction formulas. In each of these figures, the horizontal axis represents the time, the left vertical axis represents the temperature, and the right vertical axis represents the degree of curing. Moreover, in each of the figures, the solid line represents the temperature profile, and the dashed line represents the degree of curing curve. The conditions for the adhesive curing process were set to 5 hours at 80° C. in FIG. 5, 5 hours at 90° C. in FIG. 6, 3 hours at 90° C. in FIG. 7, and 2 hours at 95° C. in FIG. 8. As illustrated in FIG. 5 to FIG. 8, the targeted degree of curing of 0.25 could not be achieved even when 80° C. was maintained for 5 hours. When the temperature was held at 90° C. for 5 hours, the degree of curing reached approximately 0.6, and curing had proceeded further than the targeted degree of curing. When the temperature was held at 90° C. for 3 hours, or held at 95° C. for 2 hours, it is considered that the targeted degree of curing of 0.25 was able to be achieved.

Figure 9:
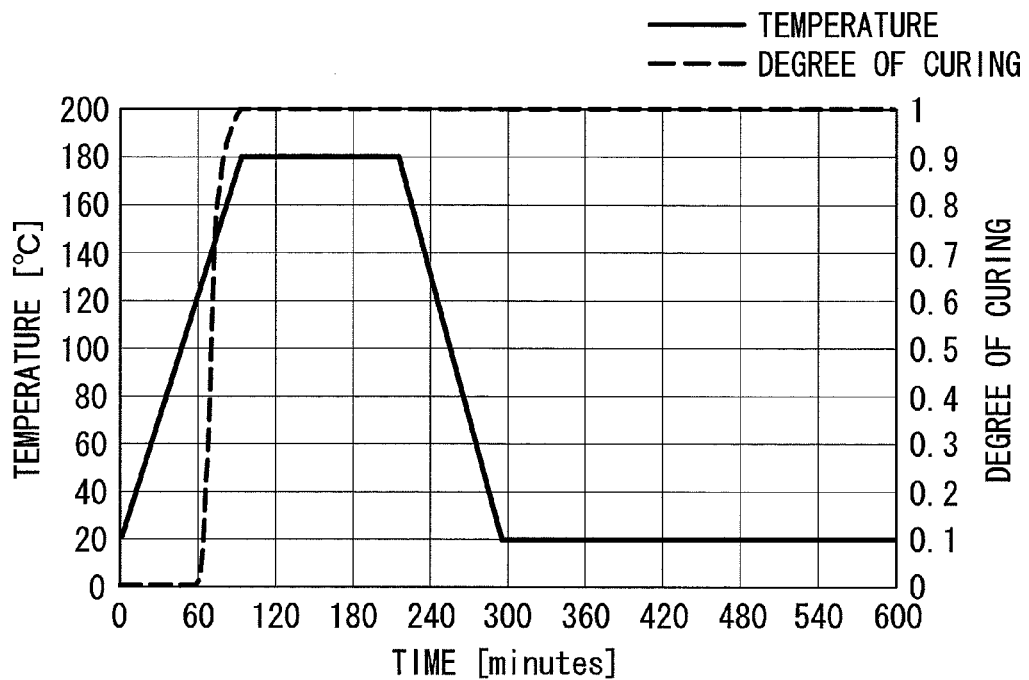
FIG. 9 illustrates a diagram showing a curing cycle in a case where curing is performed via a conventional single-stage holding cycle.
Figure 10:
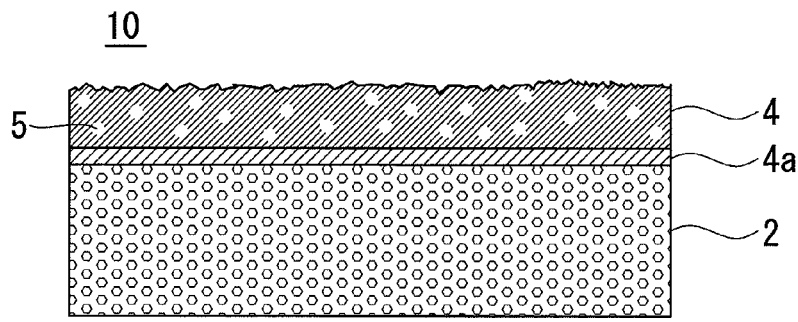
FIG. 10 illustrates a cross-sectional view of the main portions of a molded body produced using a conventional method for producing a molded body.

FIG. 9 illustrates a curing cycle in a case where curing is performed via a conventional single-stage holding cycle. In this figure, the horizontal axis represents the time, the left vertical axis represents the temperature, and the right vertical axis represents the degree of curing. Moreover, in this figure, the solid line represents the temperature profile, and the dashed line represents the degree of curing curve. The temperature when the degree of curing reached 0.25 was approximately 130° C. Because TRK510/270FMP liquefies over 100° C., it is thought that in this conventional method, the likelihood of the composite material penetrating into the interior of the porous body is very high.

In the present embodiment, the adhesive and the composite material are placed in the oven together, and both undergo curing via the same series of heating steps. As a result, the operating time is shortened. Further, by including a step of curing the adhesive, the liquefied composite material can be prevented from penetrating into the interior of the porous body.

The embodiments described above can be applied to any combination of a composite material in which a thermosetting resin is used as the matrix, and an adhesive having a curing start temperature that is lower than that of the composite material. The embodiments are particularly ideal for combinations in which the curing start temperature of the composite material and the curing start temperature of the adhesive are close to one another.

The invention claimed is:

1. A method for producing a molded body, the method comprising:
   disposing a thermosetting adhesive on a porous body;
   disposing a composite material containing a thermosetting resin as a matrix on the adhesive;
   curing the adhesive; and
   liquefying and curing the matrix of the composite material after the adhesive has been cured,
   wherein said adhesive curing operation comprises:
   acquiring a viscosity profile for the adhesive;
   acquiring calorific data for when the adhesive cures, and creating a curing reaction formula for the adhesive from the calorific data;
   correlating the viscosity profile for the adhesive and the curing reaction formula, and setting a prescribed degree of curing for the adhesive;
   setting curing reaction conditions for the adhesive, based on the curing reaction formula, so that at least the prescribed degree of curing can be achieved; and
   curing the adhesive to at least the prescribed degree of curing.

2. The method for producing a molded body according to claim 1, wherein an uncured adhesive and the composite material are disposed sequentially on the cured adhesive, and the composite material is subsequently liquefied and cured.

3. The method for producing a molded body according to claim 1, wherein said adhesive curing operation further comprises:
    acquiring a viscosity profile for the composite material, wherein
    based on the viscosity profile for the composite material and the curing reaction formula, curing reaction conditions for the adhesive are set so that at least the prescribed degree of curing can be achieved, and
    the adhesive and the composite material are disposed sequentially on the porous body, and the adhesive is subsequently cured.

* * * * *